United States Patent
Malhotra et al.

(10) Patent No.: US 11,140,156 B2
(45) Date of Patent: Oct. 5, 2021

(54) SYSTEMS AND METHODS FOR USE IN BINDING INTERNET OF THINGS DEVICES WITH IDENTITIES ASSOCIATED WITH USERS

(71) Applicant: MASTERCARD INTERNATIONAL INCORPORATED, Purchase, NY (US)

(72) Inventors: Sandeep Malhotra, Greenwich, CT (US); Rajat Maheshwari, Singapore (SG); Prashant Sharma, Madison, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 266 days.

(21) Appl. No.: 16/513,552

(22) Filed: Jul. 16, 2019

(65) Prior Publication Data
US 2021/0021589 A1   Jan. 21, 2021

(51) Int. Cl.
*H04L 29/06* (2006.01)
*G06Q 20/38* (2012.01)

(52) U.S. Cl.
CPC ...... *H04L 63/0838* (2013.01); *H04L 63/0861* (2013.01); *H04L 63/0876* (2013.01); *G06Q 20/385* (2013.01)

(58) Field of Classification Search
None
See application file for complete search history.

(56) References Cited

U.S. PATENT DOCUMENTS

| | | | |
|---|---|---|---|
| 9,768,963 B2 | 9/2017 | Chu et al. | |
| 10,454,924 B1 * | 10/2019 | Jain | H04L 63/0838 |
| 10,614,507 B2 * | 4/2020 | Patel | G06Q 30/0633 |
| 10,623,403 B1 * | 4/2020 | Gupta | H04M 3/5166 |
| 2013/0223279 A1 * | 8/2013 | Tinnakornsrisuphap | H04W 4/80 370/254 |

(Continued)

FOREIGN PATENT DOCUMENTS

CN   107944853 A   4/2018

OTHER PUBLICATIONS

U.S. Appl. No. 16/513,543, filed Jul. 16, 2019, Malhotra et al.

*Primary Examiner* — Piotr Poltorak
(74) *Attorney, Agent, or Firm* — Harness, Dickey & Pierce, P.L.C.

(57) ABSTRACT

Systems and methods are provided for binding an IoT device with an identity of a user, whereby action by the IoT device may be attributed to the user. One exemplary method includes receiving identifying data for a user, transmitting an OTP to the user, and receiving an OTP from the user. When the received OTP matches the transmitted OTP, the method includes compiling an identity for the user based on the identifying data, receiving an IoT device ID associated with an IoT device, and appending the IoT device ID to the identity of the user. The method further includes seeking authentication of the user at a communication device of the user, in response to a request indicator from the IoT device, and providing to the IoT device, in response, a confirmation of authentication of the user and/or a portion of the identifying data from the stored identity of the user.

19 Claims, 3 Drawing Sheets

(56) References Cited

U.S. PATENT DOCUMENTS

| | | | |
|---|---|---|---|
| 2013/0245849 A1* | 9/2013 | Paul | G05B 15/02 |
| | | | 700/295 |
| 2015/0317597 A1 | 11/2015 | Shucker et al. | |
| 2016/0012393 A1 | 1/2016 | Wang et al. | |
| 2016/0171479 A1* | 6/2016 | Prakash | G01D 4/004 |
| | | | 705/44 |
| 2016/0321651 A1* | 11/2016 | Douglas | G06Q 20/227 |
| 2017/0132630 A1* | 5/2017 | Castinado | G06Q 20/382 |
| 2017/0147975 A1 | 5/2017 | Natarajan et al. | |
| 2017/0203857 A1 | 7/2017 | O'Toole | |
| 2017/0293301 A1 | 10/2017 | Myslinski | |
| 2017/0302641 A1* | 10/2017 | Ramatchandirane | |
| | | | G06Q 20/123 |
| 2017/0320569 A1 | 11/2017 | Gordon et al. | |
| 2017/0345394 A1* | 11/2017 | Bansal | G06F 3/1454 |
| 2018/0018660 A1 | 1/2018 | Gomes et al. | |
| 2018/0077156 A1* | 3/2018 | Ellingson | H04L 63/0272 |
| 2018/0159855 A1* | 6/2018 | Ha | H04W 4/80 |
| 2018/0232734 A1* | 8/2018 | Smets | G06Q 20/32 |
| 2019/0057199 A1* | 2/2019 | Hutchinson | H04L 9/3271 |
| 2019/0109842 A1* | 4/2019 | Kumar | H04W 12/06 |
| 2020/0202284 A1 | 6/2020 | Singh et al. | |
| 2020/0402044 A1* | 12/2020 | Vyas | G06Q 20/3674 |
| 2021/0019698 A1 | 1/2021 | Malhotra et al. | |
| 2021/0051012 A1* | 2/2021 | Law | G06Q 20/4014 |

* cited by examiner

SYSTEMS AND METHODS FOR USE IN BINDING INTERNET OF THINGS DEVICES WITH IDENTITIES ASSOCIATED WITH USERS

FIELD

The present disclosure generally relates to systems and methods for use in binding Internet of Things (IoT) devices with identities associated with users.

BACKGROUND

This section provides background information related to the present disclosure which is not necessarily prior art.

Internet of Things (IoT) devices are known to be present in a variety of settings, including, for example, in a user's premises. The IoT devices may include smart speakers, smart televisions, smart lightbulbs, or other suitable applications and/or devices, etc. Each of the IoT devices typically is coupled to a network, whereby the IoT device may indicate actions on behalf of the user based on one or more conditions identified by the IoT device. For example, a smart speaker at the user's premises may initiate a purchase transaction for a product when instructed to do so by the user or when a replenishment rule is implicated by a condition of the user's premises.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Internet of Things (IoT) devices are often disposed within a premises associated with a user. In connection therewith, the IoT devices may initiate payment account transactions for the purchase of products (e.g., goods and services, etc.) to be delivered to the premises or elsewhere (e.g., based on rules, etc.). As can be appreciated, it is important to authenticate the user to the IoT devices prior to the payment account transactions to ensure an authorized user is initiating the transactions (or has otherwise permitted the IoT devices to initiate the transactions). Uniquely, the systems and methods herein provide for binding an identity of a user to an IoT device, whereby authentication of the user, via the identity, is permissible in connection with a transaction involving the IoT device. In particular, the identity is created with an identity network by the user, via a communication device (or other computing device, etc.). In turn, the identity is bound to the communication device. Then, by pairing the communication device with the IoT device, the IoT device may also be bound to the identity. Consequently, in connection with a transaction initiated by or through the IoT device, the IoT device may rely on the identity (bound to the user's communication device) to authenticate the user prior to initiating the transaction. In this manner, the IoT device is limited to specific authorized users, whereby unauthorized users would be inhibited from initiating transactions through the IoT device.

Figure 1:
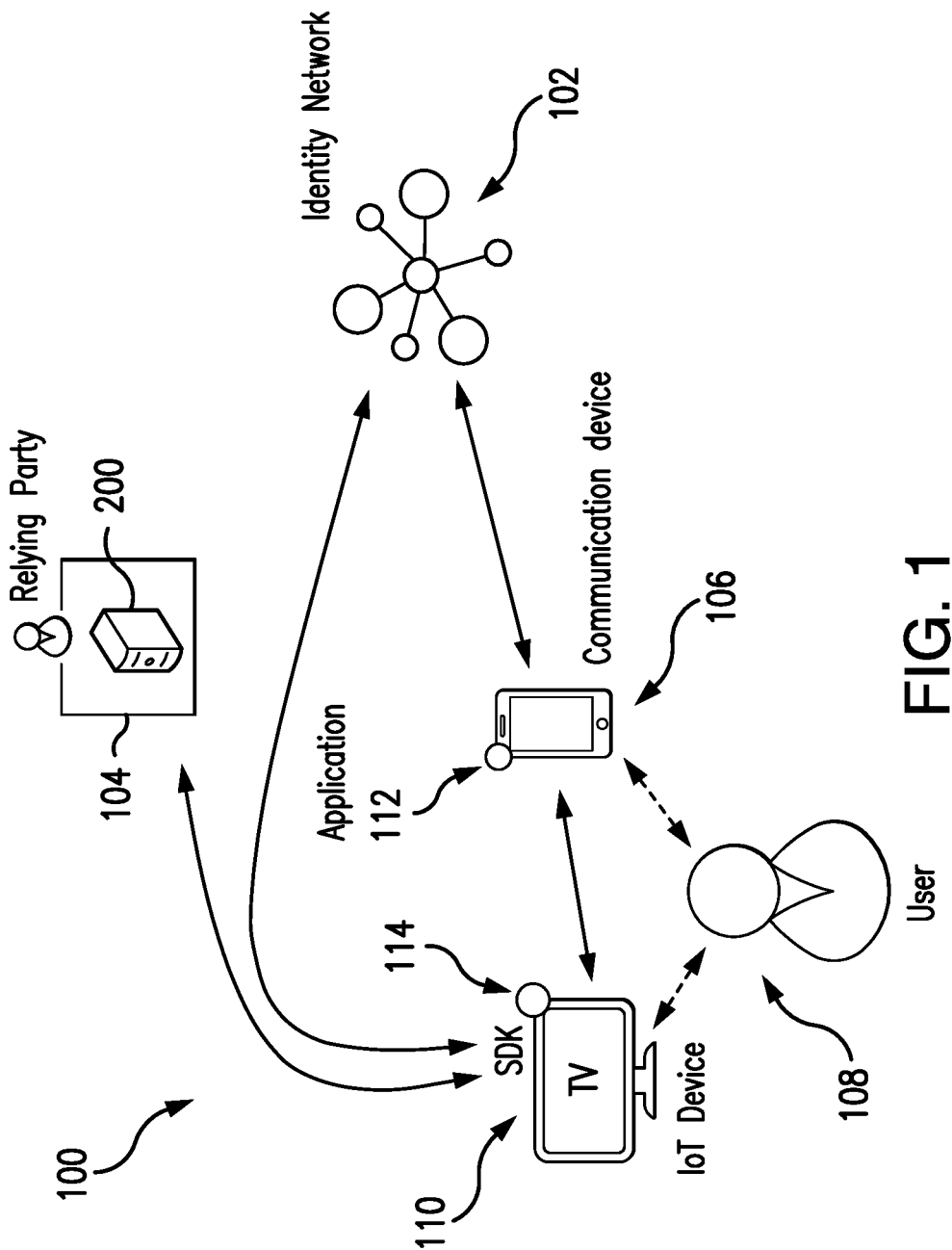
FIG. 1 illustrates an exemplary system of the present disclosure suitable for use in binding Internet of Things (IoT) devices with identities associated with users.

FIG. 1 illustrates an exemplary system 100 suitable for use in distributing parcels to recipients, and in which one or more aspects of the present disclosure may be implemented. Although the system 100 is presented in one arrangement, other embodiments may include the parts of the system 100 (or other parts) arranged otherwise depending on, for example, IoT devices at premises of users, the manner of shipping parcels to users, types of products purchased by users via the IoT devices, other types of interactions involving the IoT devices, involvement of other entities in the shipping of the parcels, etc.

The system 100 generally includes an identity network 102, a relying party 104, a communication device 106 associated with a user 108 (as indicated by the dotted arrows), and an IoT device 110 associated with the user 108 (as also indicated by the dotted arrows), each of which is coupled in communication through one or more networks, as represented by the arrowed lines in FIG. 1. Each of the one or more networks may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

In this exemplary embodiment, the identity network 102 may include any entity involved in the compilation and dissemination of identities. For example, the identity network 102 may include a payment network, such as, for example, Mastercard Corporation, etc. In general, the identity network 102 provides a network-based application 112 associated with identities of the users by which the application is installed (as approved and/or authorized by the users). In this exemplary embodiment, the application 112 is installed and active in the communication device 106. And, the identity network 102 is configured to interact with the application 112 to provide operations related to an identity of the user 108 (e.g., a digital identity, etc.), as described in more detail below. In addition, the identity network 102 provides a software development kit (SDK) 114 provided from the identity network 102, whereby the SDK 114 may be integrated into an application or operating system of the IoT device 110 (and potentially other IoT devices associated with the user 108). In connection therewith, the SDK 114 may configure the IoT device 110 (and other IoT devices associated with the user 108 and/or at a premises of the user 108, etc.) to provide operations related to the user's identity as described in more detail below.

The relying party 104 in the system 100 includes a party or entity relying on an identity of the user 108 to perform some task and/or facilitate some transaction. In various embodiments described herein, the relying party 104 includes a merchant, whereupon a transaction is to be funded by a payment account issued to the user 108 and whereby it is advantageous for the relying party 104 to authenticate the user 108 to ensure he/she is an authorized user of the payment account (prior to initiating a payment account transaction to the user's payment account). It should be appreciated, of course, that other relying parties may be included in other embodiments, in which the relying parties rely on an identity of the user 108 to confirm, directly or indirectly, his/her identity by/with the identity network 102 in connection with one or more interactions with the user 108.

Further, the communication device 106 associated with the user 108 may include, without limitation, a smartphone, a tablet, etc. Often, the communication device 106 includes a portable communication device, such that it may be carried with the user 108 when the user 108 moves from location to location (although this is not required in all embodiments). In other embodiments, the communication device 106 may instead include a workstation computing device, etc. As shown, the communication device 106 includes the network-based application 112, which is installed, in whole or in part, at the user's communication device 106. The network-based application 112 may include executable instructions to perform the operations described herein (e.g., cause the communication device 106 to perform such operations, etc.).

As indicated above, the IoT device 110 is associated with the user 108 and is disposed at a location (or premises) associated with the user 108, such as, for example, a residence, office, etc. The IoT device 110 may include a television (as illustrated in FIG. 1), a refrigerator, a washing machine, a smartwatch, a fitness tracker, a doorbell, a residence lock, a smart air conditioning or air quality device, a speaker, etc. And, often, the user 108 may be associated with multiple such devices. The IoT device 110 includes executable instructions in the form of an operating system and/or application, which cause the IoT device 110 to perform operations consistent with the intent or function of the IoT device 110. For example, an operation system of television IoT device 110 configures the device to display programming, accept user selections of programing, execute applications installed at the device, surf the Internet and various other operations, etc. As also mentioned above, the IoT device 110 includes the SDK 114 integrated into the operating system and/or an application thereof.

While only one identity network 102, one relying party 104, one communication device 106, and one IoT device 110 are illustrated in FIG. 1, it should be appreciated that any number of these entities (and their associated components) may be included in the system 100, or may be included as a part of systems in other embodiments, consistent with the present disclosure. Likewise, it should be appreciated that the system 100 is not limited to only one user 108 as numerous users (and associated communication devices) will likely be included in various implementations of the systems and methods described herein.

Figure 2:
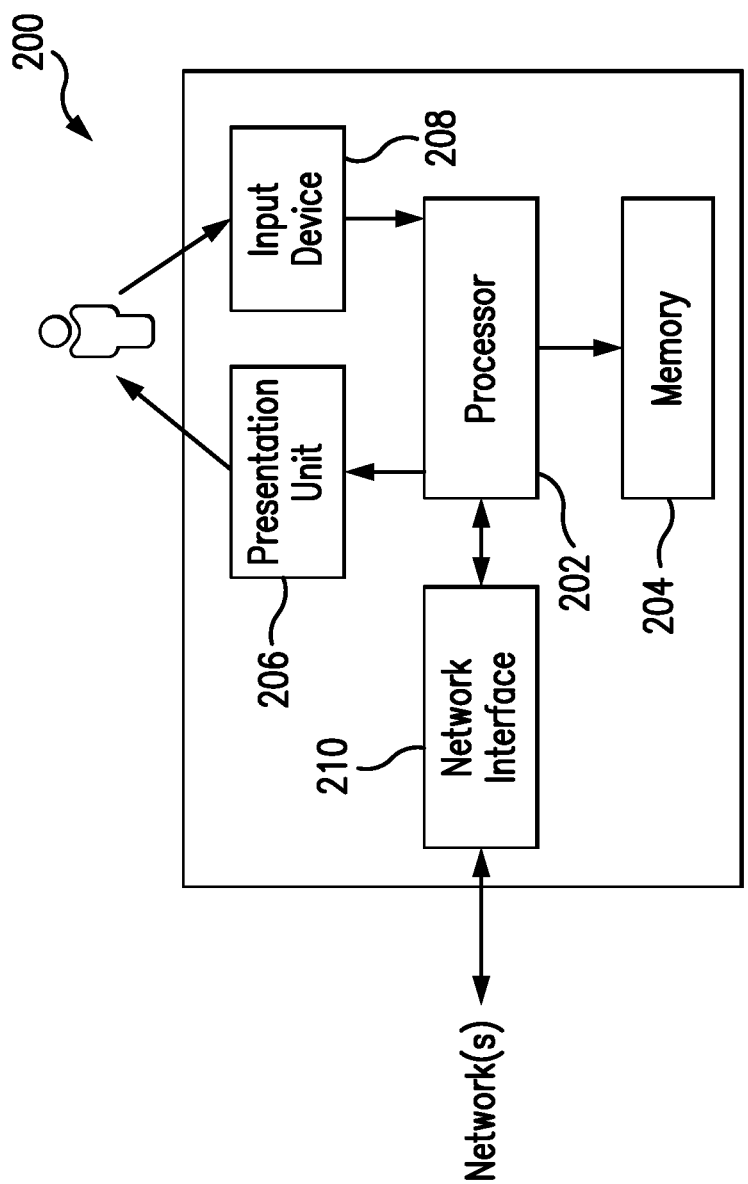
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the identity network 102, the relying party 104, the communication device 106, and the IoT device 110 include and/or are integrated into and/or are implemented in a computing device similar to (and generally consistent with) the computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity data and/or other types of data (and/or data structures) suitable for use as described herein. Furthermore, in various embodiments, computer-executable instructions may be stored in the memory 204 for execution by the processor 202 to cause the processor 202 to perform one or more of the functions described herein (e.g., one or more of the operations described in method 300, etc.), such that the memory 204 is a physical, tangible, and non-transitory computer readable storage media. Such instructions often improve the efficiencies and/or performance of the processor 202 and/or other computer system components configured to perform one or more of the various operations herein, whereby the instructions effectively transform the computing device 200 into a special purpose device. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., options for products, etc.), visually, for example, to a user of the computing device 200, such as the user 108 in the system 100, etc. And, various interfaces (e.g., as defined by network-based applications, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) such as, for example, inputs by the user 108 to the communication device 106 or IoT device 110 to purchase a product, etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC™) adapter, a Bluetooth™ adapter, etc.), a mobile network adapter, or other device capable of communicating to one or more different networks in the system 100. Further, in some exemplary embodiments, the computing device 200 may include the processor 202 and one or more network interfaces incorporated into or with the processor 202. In various embodiments, the computing device 200 may also include global positioning system (GPS) capability whereby the computing device 200 may determine its current geographic location, etc. For example, the GPS capability of the portable communication device 106 may be used to determine and transmit a location of the user 108, while the GPS capability of the IoT device 110 may be used to determine and transmit a location of the IoT device 110 for delivery purposes, etc.

Referring again to FIG. 1, in various exemplary embodiments, the user 108 registers an identity with the identity network 102, through the application 112. Initially, when the application 112 is installed, the communication device 106, as configured by the application 112, solicits identity details from the user 108. Specifically, the communication device 106 may be configured to solicit, without limitation, a name, an address, a telephone number, an email address, a biometric (e.g., a selfie image, a fingerprints, etc.), images of government identification documents (e.g., a driver's license, a passport, etc.), combinations thereof, etc. The identifying data may be solicited through one or more interfaces, or a sequence of interfaces, displayed at the communication device 106 (e.g., at the presentation unit 206, etc.), etc. In at least one embodiment, the communication device 106, as configured by the application 112, captures at least some of such identifying data from the communication device 106 and/or other applications installed therein (and, potentially, then solicits a confirmation from the user 108 of the accuracy of the same, etc.) to limit the requirement for the user 108 to reenter specific identifying data. It should be appreciated that the user 108 may similarly register his/her identity with the identity network 102 via a different computing device (other than the communication device 106), via the application 112 installed on the other computing device.

Upon receipt of the identifying data, the communication device 106 stores the data securely therein (e.g., in a secure element (SE) in memory 204 of the communication device 106, etc.), etc.

In addition, the communication device 106 is configured, by the application 112, to share at least a portion of the received identifying data with the identity network 102 (based on the user's registration therewith and based on approval and/or authorization by the user 108 to do so). For example, the communication device 106, as configured by the application 112, may transmit the name of the user 108, the user's mailing address, the selfie image, any document images, the phone number and/or email address of the user 108, an electronic identification number (EIN) for the user 108, a MAC address or other suitable ID for the communication device 106, etc. to the identity network 102. In response, the identity network 102 is configured to generate and transmit a one-time-password (OTP) to the user 108 based on either the phone number or email address provided by the user (and received from the communication device 106 during the registration process). For example, when the phone number is provided by the user 108, and when the phone number is associated with the communication device 106, the identity network 102 is configured to generate and transmit the OTP to the communication device 106 via a SMS message. Alternatively, the identity network 102 may be configured to generate and transmit the OTP to the user via email, when the email address is provided by the user 108, whereby the user 108 may access the email at the communication device 106. In either case, upon receipt of the OTP, the user 108 accesses the application 112, at the communication device 106, and enters the OTP to an interface associated with the application 112 for use in verifying an identity of the user 108. The communication device 106, as configured by the application 112, then transmits the OTP received from the user 108 to the identity network 102 to verify the OTP. In this way, the identity network is able to verify the identity of the user 108 based on the user 108 having possession of the communication device 106, etc.

When the user 108 is verified by the identity network 102 (i.e., the OTP received matched the OTP sent), the identity network 102 is configured to transmit a confirmation to the communication device 106, whereupon the identity of the user 108 is also verified at the communication device 106 and the application 112 is permitted to cause the communication device 106 to operate as described herein (in response to such verification). Additionally, the identifying data, making up the verified identity for the user 108, may be stored at the identity network 102 (e.g., as part of an identity profile for the user 108, etc.), whereby subsequent identity verification of the user 108 may involve interaction with the identity network 102.

With that said, it should be appreciated that verification of the phone number and/or email address of the user 108 by the identity network 102 may be sufficient for some implementations (e.g., as above, etc.), but not others. In such other implementations, the communication device 106, as configured by the application 112, may coordinate with the identity network 102 to provide further verification of the identifying data provided to the communication device 106, by the user 108. For example, the identity network 102 or entity associated therewith may be configured to provide validation and verification of a biometric of the user 108, alone or relative to an image of a document received from the communication device 106 That is, for example, the identity network 102 may be configured to receive a name and a biometric for the user 108 from the communication device 106 and to confirm that the biometric is specific to at least the received name with a third-party biometric repository. In another example, the identity network 102 may be configured to receive a name, an image of a document and a biometric for the user 108 from the communication device 106 and to confirm the biometric (e.g., a selfie image, etc.) and the name against the image of the document. With that said, various other validation and/or verification flows and techniques of the user's identifying data may be implemented in other embodiments. Then, following such further validation and/or verification, the identity network 102 may be configured to transmit the confirmation to the communication device 106, whereupon the identity of the user 108 is verified at the communication device 106 and the application 112 is permitted to cause the communication device 106 to operate as described herein (in response to such verification).

In addition to identifying data, the user 108 may further provide one or more payment account credentials (e.g., associated with a credit card, debit card, prepaid card, etc.) to the application 112, whereupon the communication device 106, as configured by the application 112, stores the payment account credential with or in association with the identifying data of the user (e.g., in the SE, etc.) (as part of the verified identity of the user 108, etc.). The communication device 106 may further be configured to share the payment account credentials with the identity network 102, whereupon the identity network 102 is configured to append the payment account credentials to the verified identity of the user 108 (associated with the communication device 106) and hosted by the identity network 102 (e.g., as part of the user's profile, etc.).

Once the user 108 has generated the verified identity, the user 108 is permitted to associate one or more IoT devices with the identity. Specifically, for example, the communication device 106 and the IoT device 110 are each configured to provide NFC, Bluetooth®, or other suitable close proximity communication. Accordingly, the user 108 accesses the application 112 in the communication device 106 and opts to bind the user's verified identity to the IoT device 110 (via such close proximity communication). In addition, the user 108 accesses the SDK 114 in the IoT device 110 (which in turn configures the IoT device 110) and opts to bind the IoT device 110 with the user's identity. In this exemplary embodiment, the IoT device 110 is configured to scan for suitable devices in proximity thereto. When the communication device 106 is found, the IoT device 110 is configured to display or otherwise identify the communication device 106. In response, the user 108 selects the communication device 106, whereupon the IoT device 110 is configured to display a passcode. The user 108 then enters the passcode to the application 112 of the communication device 106, and the communication device 106 and the IoT device 110 are paired. Alternatively, the communication device 106 may be configured to scan for suitable IoT devices in proximity thereto. When the IoT device 110 is found, communication device 106 is configured to display or otherwise identify the IoT device 110. In response, the user 108 selects the IoT device 110, whereupon the communication device 106 is configured to display a passcode. The user 108 then enters the passcode to the IoT device (e.g., via the SDK 114, etc.), and the communication device 106 and the IoT device 110 are paired.

It should be appreciated that the "pairing" process may be otherwise in other embodiments. In at least one embodiment, for example, pairing may be facilitated by the IoT device 110 being configured to display a QR code, and the communication device 106 being configured to scan the QR code from the IoT device 110, thereby pairing the devices.

Regardless, in connection with the pairing, the communication device 106, as configured by the application 112, captures a unique ID of the IoT device 110, such as, for example, a Bluetooth Device Address (or BD_ADDR) or other suitable address (e.g., a MAC address, etc.) depending on, for example, the IoT device 110, a manner of communication therebetween, etc. The communication device 106, as configured by the application 112, then communicates the unique ID of the IoT device 110 to the identity network 102, whereupon the identity network 102 is configured to append the unique ID for the IoT device 110 to the verified identity of the user 108 (associated with the communication device 106), as hosted by the identity network 102 (thereby binding the IoT device 110 to the identity of the user 108 for subsequent authentication of the user 108, etc.). Likewise, the IoT device 110, as configured by the SDK 114, identifies the user 108 and his/her identity as associated with the IoT device 110. In connection therewith, the communication device 106, as configured by the application 112 (and in response to verification of the user 108), may share various details of the user's identity with the IoT device 110 (e.g., the name of the user 108, payment account credential's for the user's payment account, etc.) for subsequent use by the IoT device 110 in initiating one or more interactions/transactions as described herein.

It should be appreciated that additional IoT devices may be bound to the identity of the user 108 in this same way, or a similar manner. Further, while the system 100 is described with specific reference to the IoT device 110, it should be appreciated that one or more of the interactions with the IoT device 110 described herein (or with other IoT devices in the system 100) may extend to a backend computing device associated with the IoT device 110, depending on, for example, the particular type of the IoT device 110 and the processing capabilities thereof. In connection therewith, the backend computing device may be at the premises of the user (together with the IoT device 110) or associated with a manufacturer or distributor of the IoT device 110.

Thereafter, the user 108 may decide to initiate a purchase from the relying party 104 through the IoT device 110. In connection therewith, at checkout, the IoT device 110, as configured by the SDK 114, requests that the user 108 be authenticated, prior to the purchase being permitted. In particular, the IoT device 110, as configured by the SDK 114, pushes an authentication request to the identity network 102 for the user 108. The user's identity is identified based on at least one identifier included in the request (e.g., an EIN or a MAC address, etc.), which is included in the user's verified identity at the identity network 102. Until the IoT device 110 is informed of the authentication of the user 108, the IoT device 110, as configured by the SDK 114, is not permitted to proceed with the transaction.

The identity network 102, in response, is configured to identify the communication device 106 as associated with the identified identity of the user 108 and to push a request for a passcode and/or a biometric to the communication device 106 (or other verified piece of information such as a birthday, an address, the user's age, etc.). The communication device 106, as configured by the application 112, solicits, from the user 108, such a passcode and/or biometric (or other piece of information to respond to the request such as a date of birth to verify the user's age, a driver's license to verify the user's address, etc.). When received from the user 108, the communication device 106, as configured by the application 112, transmits the passcode and/or biometric (e.g., a selfie image, etc.) (or other information) to the identity network 102. The identity network 102, in turn, is configured to authenticate the user 108 based on the received passcode and/or biometric (or other information) relative to the identifying data (e.g., verified attributes, etc.) included in the verified identity for the user 108, as stored at the identity network 102. When successfully authenticated, the identity network 102 is configured to inform the IoT device 110 that the user 108 is authenticated and the transaction may proceed. Additionally, the identity network 102 may transmit, to the IoT device 110, some or all of the verified identity data received from the user 108 for subsequent use by the IoT device 110 in initiating one or more interactions/transactions as described herein.

In response, the IoT device 110 is configured to submit a purchase request to the relying party 104, which includes a payment account credential for the user's payment account (e.g., as provided to the IoT device 110 by either the communication device 106 or the identity network 102 as described above, etc.) and an identification of the product(s) being purchased. It should be appreciated that additional information may be provided or included in the purchase request, by the IoT device 110, including, for example, the user's mailing address, the user's phone number, the user's email address, etc. In response, the relying party 104 is configured to initiate a conventional payment account transaction for the product(s) and receive an authorization reply indicating that the transaction is approved or declined (in a generally conventional manner, for example, consistent with a four-party financial transaction model, etc.). In this manner, the IoT device 110 is able to facilitate a user-authenticated purchase for the product(s) at the relying party 104.

While the above is provided with reference to a purchase request, generated by the IoT device 110, it should be appreciated that any type of requests, from which a response can be generated from the verified identity of the user, may be provided or generated by the IoT device 110 (for a relying party 104 or otherwise). For example, other requests may relate to other interactions involving the IoT device 110 and/or to may seek other information related to the user 108 and/or the verified identity of the user 108 (e.g., the request indicator may relate to confirmation of age of the user 108, etc.).

Figure 3:
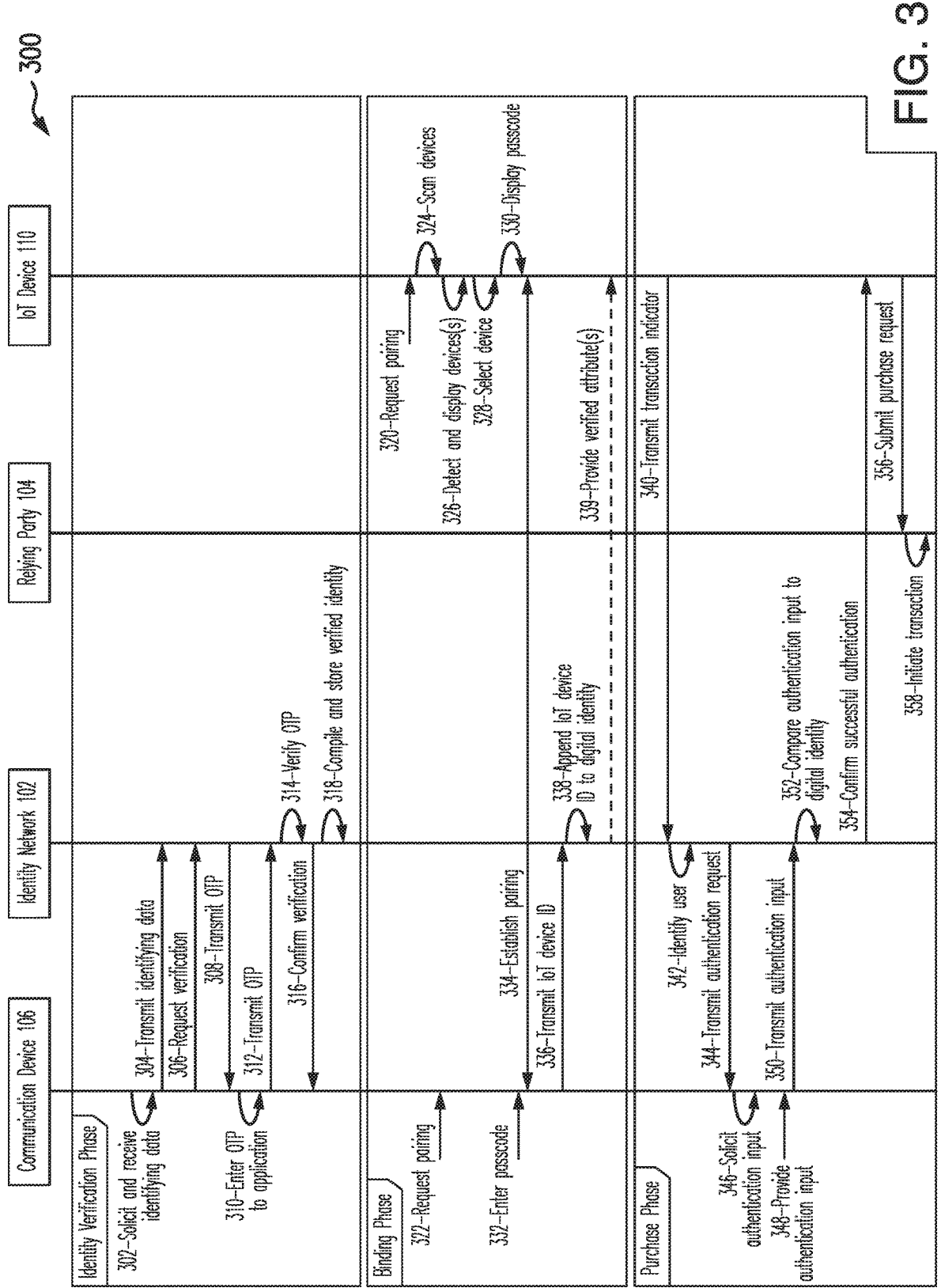
FIG. 3 is a flow diagram of an exemplary method, which may be implemented in connection with the system of FIG. 1, for binding an IoT device with an identity of a user, whereby action by the IoT device may be attributed to the user.

FIG. 3 illustrates an exemplary method 300 for use in binding an IoT device with an identity of a user, whereby action, by the IoT device, may be attributed to the user. The exemplary method 300 is described as implemented generally in the system 100. The method 300 is also described with reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the exemplary method 300.

At the outset, the method 300 generally includes an identity verification phase, a binding phase, and a purchase phase. As part of the identity verification phase, the communication device 106 (as configured by the application 112, and which configuration carries through generally throughout the method 300) solicits and receives, at 302, identifying data from the user 108 (e.g., upon adding the application 112 to the communication device, when desired by the user 108 to create a verified identity, etc.). Specifically, one or more interfaces are displayed, by the application 112, to the communication device 106 (e.g., at the presentation unit 206 thereof, etc.) which solicit, for example, one or more of a name of the user 108, a mailing address, a phone number, an email address, a passport number, a driver's license number, a biometric (e.g., a selfie image, etc.), images of identifying documents (e.g., a passports, a driver's license, a government ID card, etc.), a payment account credential for the user's payment account, etc. When the user 108 provides the identifying data, it is received by the communication device 106 and compiled into an identifying data profile for the user 108. The profile is stored, by the communication device 106, in memory 204 (e.g., in a secure element (SE) within the communication device 106, etc.).

In addition, the communication device 106 transmits, at 304, the identifying data, or at least a portion thereof, to the identity network 102 (e.g., following approval and/or authorization by the user 108 to do so, etc.). In general, the identifying data transmitted by the communication device 106 will include at least a phone number for the user 108 (e.g., for the user's communication device 106, for another device associated with the user 108, etc.) or an email address for the user (whereby the user 108 may access emails addressed to the email address at his/her communication device 106, etc.).

Then, in connection with verifying the identifying data provided by the user 108 through the application 112, the communication device 106 requests, at 306, verification of an identity of the user 108 from the identity network 102. The request may be included as part of the transmission of the identifying data for the user 108 (at 304), or it may be transmitted separately to the identity network 102. In either case, the verification request generally relates to certain identifying data for the user 108 such as, for example, the user's email address and/or the user's phone number. In response, the identity network 102 generates an OTP and transmits, at 308, the OTP to the communication device 106 via a SMS message and/or an email message, which utilizes the identifying data received from the user 108 in order to provide the message to the communication device 106 (i.e., the phone number of the user 108 and/or the email address of the user 108, etc.). The user 108, in turn, receives the OTP at the communication device 106, as a SMS message or via an email message at the communication device 106 or other device. It should be appreciated that if the phone number is not correct or the email address is not correct, the SMS message and/or the email message will not be directed to the user 108 (such that the user 108 will not actually receive the OTP and will not be verified). When received, though, the user 108 then accesses the application 112 and enters, at 310, the OTP to the application 112 (e.g., in an interface associated with verifying the user's identity, etc.). And, in response, the communication device 106 transmits, at 312, the OTP to the identity network 102.

In response, the identity network 102 verifies, at 314, the OTP based on matching the OTP received from the communication device 106 to the OTP transmitted to the user 108 (at 306). When there is a match, the user 108 and/or the communication device 106 is/are verified, and the identity network 102 confirms, at 316, the verification to the application 112 (at the communication device 106), which permits the application 112 to be activated and/or enabled for identity related operations. And, the identity network 102 compiles and stores, at 318, a verified identity for the user 108 and/or the communication device 106.

It should be appreciated that the communication device 106 may only transmit the user's phone number and/or email address to the identity network 102 (at 304) as part of requesting verification of the user's identity (before sending the remaining part of the user's identity data to the identity network 102). The communication device 106 may then transmit the remaining identity data for the user 108 (as received from the user at 302) to the identity network 102 upon receipt of the verification from the identity network 102 (at 316). In any case, then, upon receipt of the identity data for the user 108, now making up the verified identity for the user 108 (e.g., where such identity data includes one or more of the name of the user 108, the mailing address, the user's phone number, the user's email address, the user's passport number, the user's driver's license number, biometrics for the user 108, images of identifying documents associated with the user 108, payment account credential(s) for the user's payment account, etc. (all, broadly, verified attributes of the user 108)), the data may be stored at the identity network 102 (e.g., as part of an identity profile for the user 108, etc.).

Thereafter, in the binding phase of the method 300, the user 108 may decide to pair the communication device 106, and the corresponding identity for the user 108, to the IoT device 110 associated with the user 108. In particular, the user 108 requests, at 320, to pair the IoT device 110, and further accesses the application 112 and requests, at 322, to pair the communication device 106. In this exemplary embodiment, the IoT device 110 coordinates the pairing, but it may be different in other embodiments. Specifically in this embodiment, the IoT device 110 scans, at 324, for suitable devices within range/communication of the IoT device 110. Because the user 108 has indicated an intent to pair the communication device 106, the communication device 106 is ready to be paired. As such, the communication device 106 is detected by the IoT device 110, at 326, and displayed, at the presentation unit 206 of the IoT device 110, for viewing by the user 108.

The user 108, in response, selects the communication device 106, at 328. The IoT device 110 then displays, at 330, at the presentation unit 206, a passcode. The user 108 reads the passcode from the IoT device 110 and enters, at 332, the passcode to a prompt displayed at the communication device 106. Thereafter, the communication device 106 transmits the passcode to the IoT device 110, thereby permitting the IoT device 110 and the communication device 106 to establish pairing, at 334. In connection therewith, at least one unique identifier (e.g., an IoT device ID such as a Bluetooth Device Address (or BD_ADDR), and IP address, etc.) associated with the IoT device 110 is passed to the communication device 106. The communication device 106, in turn, transmits the IoT device ID to the identity network 102, at 336. And, at 338, the identity network 102 appends the IoT device ID to the identity of the user 108. As a result of the above, the identity is bound to the IoT device 110.

It should be appreciated that once the IoT device 110 is identified to the identity network 102 (at 336), the identity network 102 may, at 339, optionally (as indicated by the dotted line in FIG. 3) provide the verified identity (or portions thereof (e.g., one or more verified attributes of the user 108 from the user's verified identity, etc.)) to the IoT device 110. For example, a mailing address of the user 108 and/or a payment credential for the user's payment account may be provided to the IoT device 110, whereby a purchase request or other interaction associated with the purchase phase, as described below, may be initiated by the IoT device 110. It should further be appreciated that the data from the verified identity shared with the IoT device 110 may be limited, whereby further authorization by the user 108 may be required to receive additional information needed to complete the purchase (or, in general, to complete the purchase). For example, a payment account credential may only be shared with the IoT device 110 for indicated transactions, based on authorization of the user 108, for example, for each transaction.

Finally in the method 300, in the purchase phase, from time to time, after the user's verified identity is bound to the IoT device 110, the user 108 may initiate a purchase (or the IoT device 110 may initiate a purchase) for one or more products. When a request for a transaction is initiated by or through the IoT device 110 (for product(s) included in a shopping cart, etc.), the IoT device 110, as configured by the SDK 114, seeks authentication of the user 108 prior to proceeding with the transaction. In so doing, the IoT device 110 transmits, at 340, a transaction indicator to the identity network 102, where the transaction indicator includes a unique ID of the IoT device 110 (e.g., the IoT device ID from step 336, etc.). While the IoT device 110 transmits a transaction indicator in this exemplary embodiment, the transaction indicator is one example of a request indicator. That said, it should be appreciated that the request indicator may be related to other interactions involving the IoT device 110 and/or to may seek other information related to the user 108 and/or the verified identity of the user 108 (e.g., the request indicator may relate to confirmation of age of the user 108, etc.).

In response, the identity network 102 identifies the user 108 and/or the communication device 106, at 342 (e.g., based on the unique ID of the IoT device 110, etc.), and transmits an authentication request, at 344, to the communication device 106. In turn, the communication device 106, as configured by the application 112, solicits an authentication input, such as, for example, a password or biometric (or other verified piece of information such as a birthday, an address, the user's age, etc.), from the user 108, at 346. When the user 108 provides the authentication input, at 348, the communication device 106 transmits, at 350, the authentication input to the identity network 102.

The identity network 102 then compares, at 352, the authentication input received from the communication device 106 to the verified identity stored in memory 204 of the identity network 102 (and the various verified attributes of the user 108 associated therewith). When the match fails (e.g., there is no match, etc.), the identity network declines the request indicator, for example, by issuing an error or failed authentication message to the IoT device 110 and/or the communication device 106.

When there is a match, however, the identity network 102 confirms, at 354, to the IoT device 110, a successful authentication from the user 108. Additionally, or alternatively, when there is a match, the identity network 102 may provide identifying data from the verified identity of the user 108 to the IoT device 110, including, for example, a payment credential, etc., in response to the transaction indicator, whereby the payment credential may be employed by the IoT device 110 to submit a purchase request for a product (e.g., if the IoT device 110 does not already have the credential, etc.).

With this confirmation (and/or data), the IoT device 110 submits, at 356, a purchase request to the relying party 104, which includes a payment account credential for the user's payment account and an identification of the product(s) being purchased. And, the relying party 104 initiates, at 358, the transaction in a conventional manner, whereby the transaction is approved or declined (in accordance with a conventional four-party system). In connection therewith, the relying party may notify the IoT device 110 of the result of the transaction, whereby the IoT device 110 may then transmit a notification to the user's communication device 106 regarding the same (e.g., via the application 112, etc.).

It should be appreciated that in addition to transactions or other interactions via the IoT device 110, the user's verified identity, as stored at the identity network 102, may be employed to answer various questions related to the user 108 (as posed by the relying party 104, etc.). In such embodiments, a request indicator may include a question and/or a request for specific identifying data associated with the user 108. For example, the request indicator may seek to confirm an age of the user 108, based on the date of birth of the user 108 included in the user's verified identity. Or, the request indicator may seek the address of the user 108 included on the user's driver's license included in the user's verified identity.

In view of the above, the systems and methods herein provide for binding an IoT device with an identity of a user. In this manner, the identity of the user may be confirmed, whereby the user is authenticated, in connection with certain actions of the IoT device, thereby inhibiting users unbound to the IoT device from causing such certain actions of the IoT device. As such, the IoT device may be enabled to perform additional transactions where the authorization of the user is performed, such as, for example, payment transactions, etc., whereby the actions are attributed to the bound user and impermissible for the unbound user(s) (e.g., thereby providing authentication and fraud protection features at the IoT device, etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a computing device, identifying data for a user; (b) transmitting, by the computing device, a one-time-password (OTP) to the user based on a phone number or an email address included in the identifying data; (c) receiving, by the computing device, an OTP from an application included in a communication device associated with the user; (d) when the received OTP matches the transmitted OTP, compiling and storing, by the computing device, in memory associated with the computing device, an identity for the user based on the identifying data for the user; (e) receiving, by the computing device, an IoT device ID associated with an IoT device, from the application included in the communication device; (f) appending, by the computing device, the IoT device ID to the identity of the user; (g) receiving, by the computing device, a request indicator from the IoT device, the request indicator including the IoT device ID; (h) seeking, by the computing device, authentication of the user at the communication device, via the application; (i) in response to the request indicator, providing, by the computing device, to the IoT device, a confirmation of authentication of the user and/or a portion of the identifying data from the stored identity of the user, when an authentication input from the communication device matches the stored identity of the user; and (j) identifying the user based on the IoT device ID in response to the request indicator, prior to seeking authentication of the user at the communication device.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for binding an IoT device with an identity of a user, whereby action, by the IoT device, may be attributed to the user, the method comprising:
   receiving, at a computing device, identifying data for a user;
   transmitting, by the computing device, a one-time-password (OTP) to the user based on a phone number or an email address included in the identifying data;
   receiving, by the computing device, an OTP from an application included in a communication device associated with the user;
   when the received OTP matches the transmitted OTP, compiling and storing, by the computing device, in memory associated with the computing device, an identity for the user based on the identifying data for the user;
   receiving, by the computing device, an IoT device ID associated with an IoT device, from the application included in the communication device;
   appending, by the computing device, the IoT device ID to the identity of the user;
   receiving, by the computing device, a request indicator from the IoT device, the request indicator including the IoT device ID;
   seeking, by the computing device, authentication of the user at the communication device, via the application; and
   in response to the request indicator, providing, by the computing device, to the IoT device, a confirmation of authentication of the user and/or a portion of the identifying data from the stored identity of the user, when an authentication input from the communication device matches the stored identity of the user.

2. The computer-implemented method of claim 1, wherein the identifying data further includes a name, a mailing address, and a biometric associated with the user.

3. The computer-implemented method of claim 1, further comprising identifying the user based on the IoT device ID in response to the request indicator, prior to seeking authentication of the user at the communication device.

4. The computer-implemented method of claim 1, wherein seeking authentication of the user at the communication device includes transmitting an authentication request to the communication device, via the application; and
   further comprising:
      receiving the authentication input from the communication device, via the application, in response to the authentication request; and
      comparing the authentication input to the stored identity of the user.

5. The computer-implemented method of claim 1, wherein the IoT device includes one of a smart television and a smart appliance.

6. The computer-implemented method of claim 1, further comprising:
   pairing, by the communication device, with the IoT device; and
   transmitting, by the communication device, the IoT device ID to the computing device in response to said pairing with the IoT device.

7. A non-transitory computer readable storage medium including executable instructions for binding an IoT device with an identity of a user, which when executed by at least one processor, cause the at least one processor to:
   receive an IoT device ID associated with an IoT device, from an application included in a communication device, the communication device associated with a user and a verified identity of the user;
   append the IoT device ID to the verified identity of the user;
   receive a request indicator from the IoT device, the request indicator including the IoT device ID;
   seek authentication of the user at the communication device, via the application; and
   in response to the request indicator, provide a confirmation of authentication of the user and/or identifying data from the verified identity of the user to the IoT device, when an authentication input from the communication device matches the verified identity of the user.

8. The non-transitory computer readable storage medium of claim 7, wherein the executable instructions, when executed by the at least one processor, cause the at least one processor, in connection with seeking authentication of the user at the communication device, to transmit an authentication request to the communication device, via the application; and
   wherein the executable instructions, when executed by the at least one processor, further cause the at least one processor to:
      receive the authentication input from the communication device, via the application, in response to the authentication request; and
      compare the authentication input to the stored identity of the user.

9. The non-transitory computer readable storage medium of claim 7, wherein the request indicator includes a transaction indicator, and wherein the identifying data includes a payment account credential for a payment account associated with the user.

10. The non-transitory computer readable storage medium of claim 7, wherein the authentication input includes a biometric of the user.

11. The non-transitory computer readable storage medium of claim 7, wherein the executable instructions, when executed by the at least one processor, further cause the at least one processor to decline the request indicator when the authentication input fails to match the verified identity of the user.

12. A system for use in binding an IoT device with an identity of a user, whereby action, by the IoT device, may be attributed to the user, the system comprising an identity network computing device configured to:
   receive identifying data for a user;
   transmit a one-time-password (OTP) to the user based on a phone number or an email address included in the identifying data;
   receive an OTP from an application included in a communication device associated with the user;
   when the received OTP matches the transmitted OTP, compile and store in memory associated with the identity network computing device, an identity for the user based on the identifying data for the user;
   receive an IoT device ID associated with an IoT device, from the application included in the communication device;
   append the IoT device ID to the identity of the user;
   receive a request indicator from the IoT device, the request indicator including the IoT device ID;

seek authentication of the user at the communication device, via the application; and in response to the request indicator, provide, to the IoT device, a confirmation of authentication of the user and/or a portion of the identifying data from the stored identity of the user, when an authentication input from the communication device matches the stored identity of the user.

13. The system of claim 12, wherein the identifying data further includes a name, a mailing address, and a biometric associated with the user.

14. The system of claim 12, wherein the request indicator includes a transaction indicator, and wherein the identifying data includes a payment account credential for a payment account associated with the user.

15. The system of claim 12, wherein the authentication input includes a biometric of the user.

16. The system of claim 12, wherein the identity network computing device is further configured to identify the user based on the IoT device ID in response to the request indicator, prior to seeking authentication of the user at the communication device.

17. The system of claim 12, wherein the identity network computing device is configured, in connection with seeking authentication of the user at the communication device, to transmit an authentication request to the communication device, via the application; and wherein the identity network computing device is further configured to:
  receive the authentication input from the communication device, via the application, in response to the authentication request; and
  compare the authentication input to the stored identity of the user.

18. The system of claim 12, wherein the IoT device includes one of a smart television and a smart appliance.

19. The system of claim 12, further comprising a non-transitory computer readable storage medium including executable instructions, which when executed by at least one processor of the communication device, cause the at least one processor to transmit, via the application, the IoT device ID to the identity network computing device in response to pairing of the communication device with the IoT device.

* * * * *